United States Patent [19]
Eidsmore

[11] Patent Number: 4,793,379
[45] Date of Patent: Dec. 27, 1988

[54] SUPPLY CYLINDER SHUT-OFF AND FLOW CONTROL VALVE

[76] Inventor: Paul G. Eidsmore, 2 Blue Hill Ct., Scotts Valley, Calif. 95066

[21] Appl. No.: 127,634

[22] Filed: Dec. 2, 1987

Related U.S. Application Data

[63] Continuation of Ser. No. 830,286, Feb. 18, 1986, abandoned, which is a continuation-in-part of Ser. No. 826,022, Feb. 4, 1986, Pat. No. 4,694,860, which is a continuation-in-part of Ser. No. 675,825, Nov. 28, 1984, Pat. No. 4,624,443, which is a continuation-in-part of Ser. No. 398,845, Jul. 16, 1982, abandoned.

[51] Int. Cl.⁴ .................................................. F16K 17/28
[52] U.S. Cl. .................................. 137/614.19; 137/460; 137/505.41; 137/505.42; 251/65
[58] Field of Search ............................ 251/65, 123, 127; 137/613, 614.19, 505, 505.42, 460

[56] References Cited

U.S. PATENT DOCUMENTS

| | | | |
|---|---|---|---|
| 2,478,040 | 8/1944 | Campbell, Jr. et al. | 137/505.42 |
| 2,591,407 | 1/1946 | Cornelius | 137/505.41 |
| 2,700,395 | 1/1955 | Young | 251/65 X |
| 2,702,561 | 2/1955 | Geffroy | |
| 2,888,033 | 5/1959 | Eickmeyer | 137/505 |
| 3,044,486 | 7/1962 | Miller | 137/505.42 |
| 3,131,717 | 5/1964 | Gratzmuller | 251/127 |
| 3,269,411 | 8/1966 | Teston | 137/613 |
| 3,286,726 | 11/1966 | Guy | 137/505.42 X |
| 3,709,255 | 1/1973 | Ciotti | 137/614.19 |
| 3,877,478 | 4/1975 | Longworth | 251/65 X |
| 4,178,958 | 12/1979 | Palau | 137/460 X |

FOREIGN PATENT DOCUMENTS 798754  1/1981  U.S.S.R. ............... 137/614.19

Primary Examiner—Robert G. Nilson
Attorney, Agent, or Firm—Fay, Sharpe, Beall, Fagan, Minnich & McKee

[57] ABSTRACT

A button-operated main shut-off and flow-control valve is disclosed which attaches directly to a supply cylinder in place of the conventional rotary-stem shut-off valve. Magnetic actuators in the valve eliminate the hazards of leaky seals around moving or rotating parts. Excess flow control is provided by internal valve elements which inhibit further fluid flow in excess of a design limit, and pressure regulation is provided within the same housing so that extremely low profile is preserved and fluid connections are significantly reduced for improved operating safety.

6 Claims, 4 Drawing Sheets

SUPPLY CYLINDER SHUT-OFF AND FLOW CONTROL VALVE

CROSS REFERENCE TO RELATED APPLICATIONS

This application is a continuation application of application Ser. No. 830,286 filed Feb. 18, 1986, now abandoned, which is a continuation-in-part application of Ser. No. 826,022 filed Feb. 4, 1986, now U.S. Pat. No. 4,694,860, entitled FLUID FLOW ISOLATION AND CONTROL APPARATUS AND METHOD, which is a continuation-in-part application of application Ser. No. 675,825 filed Nov. 28, 1984, now U.S. Pat. No. 4,624,443 entitled FLUID-FLOW CONTROL VALVE AND METHOD, which is a continuation-in-part application of application Ser. No. 398,845 filed July 16, 1982, now abandoned, entitled FLOW LIMIT VALVE, and is related to the subject matter contained in pending application Ser. No. 826,021 entitled FLUID PRESSURE REGULATION AND METHOD.

BACKGROUND OF THE INVENTION

The present invention relates to shut-off valves for supply cylinders of pressurized gas, and more specifically to a button-controlled valve which operates to provide fluid shut-off, manually-controlled fluid flow, excess flow control, and pressure-regulator flow control, all within a safety-oriented housing that attaches directly to a supply cylinder of gas under pressure.

Certain known valves for controlling the flow of gas under pressure rely upon internal valve elements which are controlled externally via a rotating valve stem, or the like, and such valve stems require rotating or sliding seals to prevent escape of the fluid under pressure around the valve stem. Such manually-operated valves are widely used as the main shut-off valve on top of a supply cylinder of fluid under pressure. However, recent developments of the wide scale use of highly-toxic gases in the semiconductor industry have prompted careful review of the poor safety features associated with the conventional shut-off valve which is based upon a rotating seal that is highly subject to failure and which requires many manual turning strokes to shut off the flow of pressurized gas from the cylinder. Such valves are unsuitable for quickly controlling emergency conditions of fire or toxic gas leaks, or the like. Also, these shut-off valves are usually heavily cluttered with excess-flow control valves, pressure regulators, and the like, connected thereto which further inhibits convenient manual control of such conventional valves. Also, high-pressure connections associated with components that attach to the main shut-off valve are highly vulnerable to leak and rupture due to the cylinder falling over, or the exposed components being banged or the fluid lines connected thereto being pulled.

SUMMARY OF THE PRESENT INVENTION

In accordance with the present invention, the conventional main shut-off valve on a supply cylinder of gas under pressure is replaced by an improved button-operated valve which, has no seals that can leak pressurized fluid into the environment. The present invention provides excess-flow control and pressure regulation within a single unit that exhibits only a minimum of exposed components above the supply cylinder. A high degree of integrity against gas leaks is assured by using magnetic actuation of the valve components within the body that is sealed after assembly using electron-beam welding techniques on all joints and seams.

DESCRIPTION OF THE PREFERRED EMBODIMENT

Figure 1:
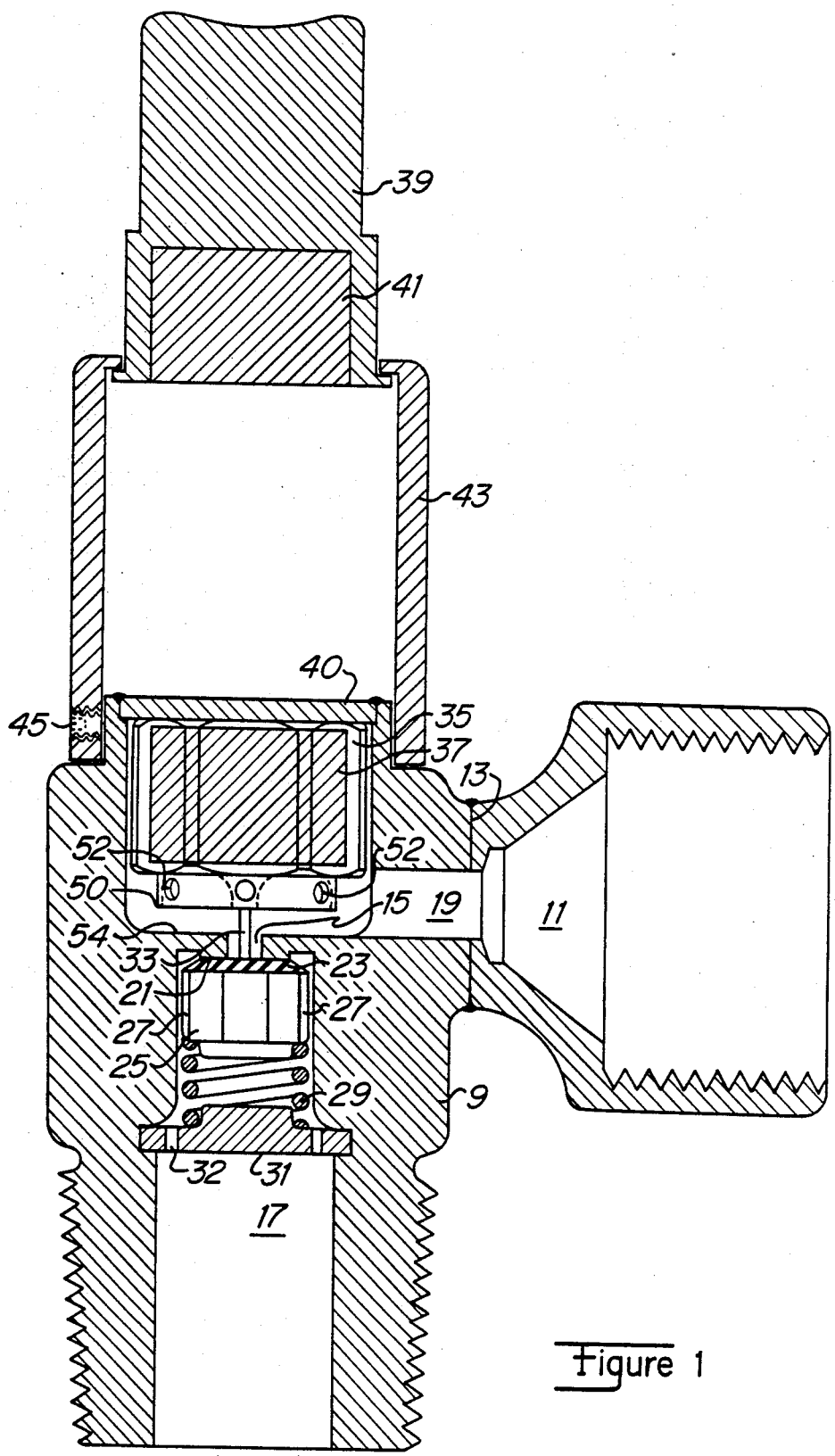
FIG. 1 is a pictorial sectional view that illustrates one embodiment of the valve of the present invention.

Referring now to FIG. 1, there is shown an internal pictorial view of the generally cylindrical housing 9 that is threaded at the lower end for threaded connection directly to the top of a supply cylinder of ga.. A standard outlet connection 11 is welded 13 to the body 9, for example, by conventional electron-beam welding techniques. The body 9 includes an internal, central aperture 15 between inlet channel 17 and outlet channel 19, and includes a surrounding sealing surface or valve seat 21 on the inlet side of the aperture 15. Piston element 25 is slidably mounted within inlet channel 17 and carries an elastomeric wafer or seal 23 of suitable material such as a perfluoroelastomer (available as KALREZ from DuPont Co.) for forming a fluid-tight seal with valve seat 21. The piston element 25 includes grooves 27 or flats on its generally cylindrical outer surfaces, for reasons later described, to allow gas under pressure to flow past the piston element 25 and through the aperture 15 (when open) to the outlet channel 19. A spring 29 and spring retainer 31 are disposed beneath the piston element 25 to resiliently urge the seal 23 into fluid-tight normally-closed, sealing engagement with the valve seat 21. Of course, retainer 31 is arranged to pass the fluid under pressure via passage 32, or via a square shape in a cylindrical bore, or the like. The pressure-enhanced and spring-enhanced seal 21, 23 is controlled by the central rod 33 which is attached to the piston element 25 and which protrudes through the aperture 15 into the outlet channel 19. A slide element 35 containing a magnet 37 encapsulated therein is slidably mounted within the outlet channel to selectively exert control force upon the rod 33 to open the seal formed around aperture 15. This element 35 is supported by the spring 29 (via piston 25 and central rod 33), and thus does not affect the normally closed condition of the valve while the actuating button 39 with its encapsulated magnet 41 are in the remotest position, as shown. It should be noted that magnets 37 and 41 are repulsion oriented so that the weight of the button 39 and magnet 41 are also supported through such repelling force by the spring 29. End plate 40 may be electron-beam welded to the housing 9 at the upper end of the outlet channel 19 to seal the housing against the possibilities of leaks. The parts of the present invention may thus be formed of such materials as stainless steel or aluminum or plastic, or the like, to provide welded integrity against leaks without significantly interfering with the controlling magnetic field externally applied by magnet 41. A cylindrical retainer and guide 43 for button 39 may be attached to the housing by a set screw 45, or other suitable attachment means, to establish the three distinct operating positions of button 39, as illustrated in FIGS. 1, 2 and 3.

In operation, with the button 39 in the remotest position as shown in FIG. 1, the valve remains normally-closed in response to the spring-enhanced and pressure-enhanced seal established between valve seat 21 and seal 23. To open the valve completely, the button 39 is fully depressed against the resilience of repelling magnets 37 and 41, as illustrated in FIG. 2. This exerts substantial magnetic-repelling force upon magnet 37 associated with slide element 35 which, in turn, exerts sufficient force against rod 33, piston 25 and spring 29 to overcome the spring-enhanced and pressure-enhanced sealing force and opens the aperture 15 to fluid flow therethrough. In this operating mode of the illustrated embodiment, manual force 42 must be continually applied to button 39 to retain it in the most proximate position, as illustrated, for as long as the valve is to remain open. Of course, the size, weight, magnetic flux and relative spacing of the magnets 37 and 41, and the spring force exerted by spring 29 may all be selected to establish the above operating mode.

Figure 2:
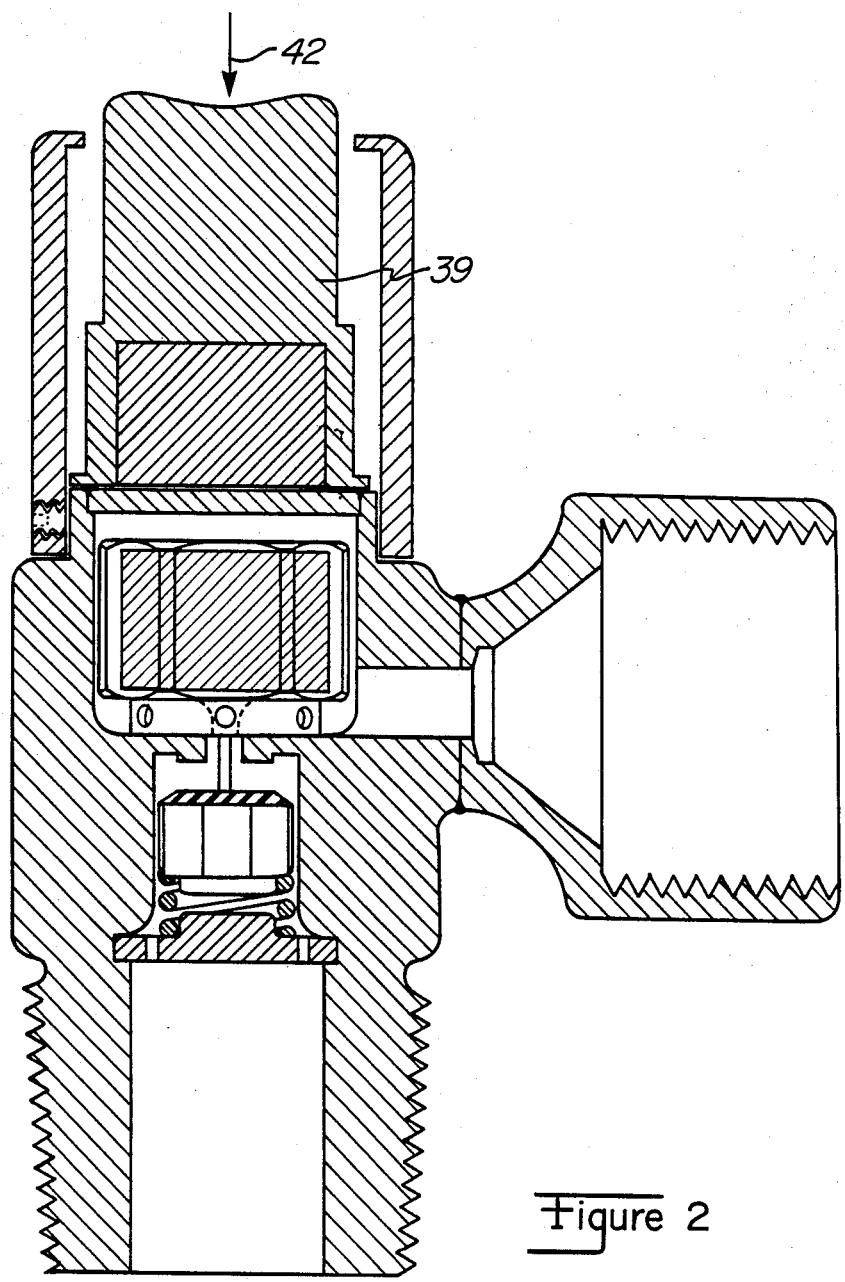
FIG. 2 is a pictorial sectional view of the valve of FIG. 1 operating fully open under manual control.
Figure 3:
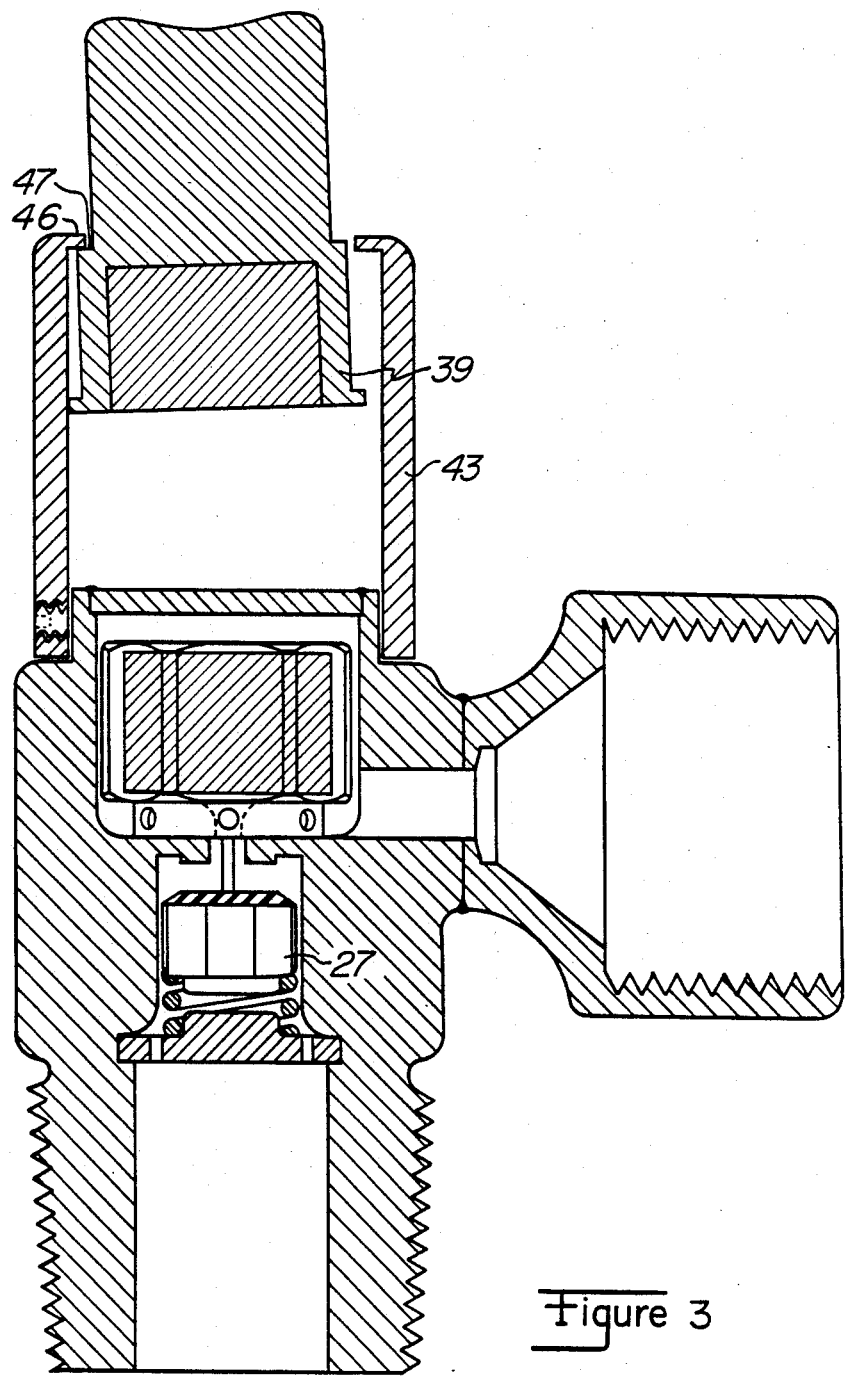
FIG. 3 is a pictorial sectional view of the valve of FIG. 1 operating as an excess-flow controller.

Referring now to FIG. 3, the valve embodiment of FIGS. 1 and 2 is illustrated with the button 39 'latched' in an intermediate position by the intruding upper flange 46 of retainer and guide 43 engaging the shoulder 47 on button 39. In this position of button 39, the combined magnetic repulsion force between magnets 37 and 41, and the weight of element 35 and piston 25, is sufficient to overcome the opposing spring force of spring 29. This retains the valve in open condition with the magnetic force plus weight of element 35 and piston 25 selected to slightly exceed the spring force of spring 29.

With reference to the flats or grooves 27 in the surface of the piston 25, the cross sectional area of these fluid-flow passages is selected to establish an increment of force that is related to the flow rate of fluid (of given density) therethrough. Thus, a flow rate of fluid through the flats or grooves 27 in excess of a selected value establishes a force that, combined with the spring force of spring 29, lifts the piston 25 and seal 23 into engagement with valve seat 21 against the weight of elements 35 and piston 25 and the repelling force of magnets 37 and 41. The valve thus closed by the excess flow of fluid remains closed by the spring-enhanced and pressure-enhanced seal that is formed over aperture 15, until the valve is opened and reset by fully depressing the button 39 to the position and operating mode illustrated and described in connection with FIG. 2.

The illustrated embodiment of the valve of FIGS. 1, 2 and 3 includes a descending skirt or shield carried by element 35 that includes lateral apertures 52 for passing therethrough the gas that flows through aperture when the valve is fully or partially open. The shield 50 is effective to impede the development of additional forces, due to the Bernoulli effect, between element 35 and the surface 54 of housing 9. By the Bernoulli effect, fluid flow at high velocity between two surfaces reduces the pressure, and hence, the relative forces acting on the surfaces. The shield 50 with aperture 52 assures that the fluid which flows through open aperture 15 will not reduce the forces acting on element 35 relative to surface 54 of housing 9, and a cause of oscillatory motion of element 35 is thereby eliminated.

Figure 4:
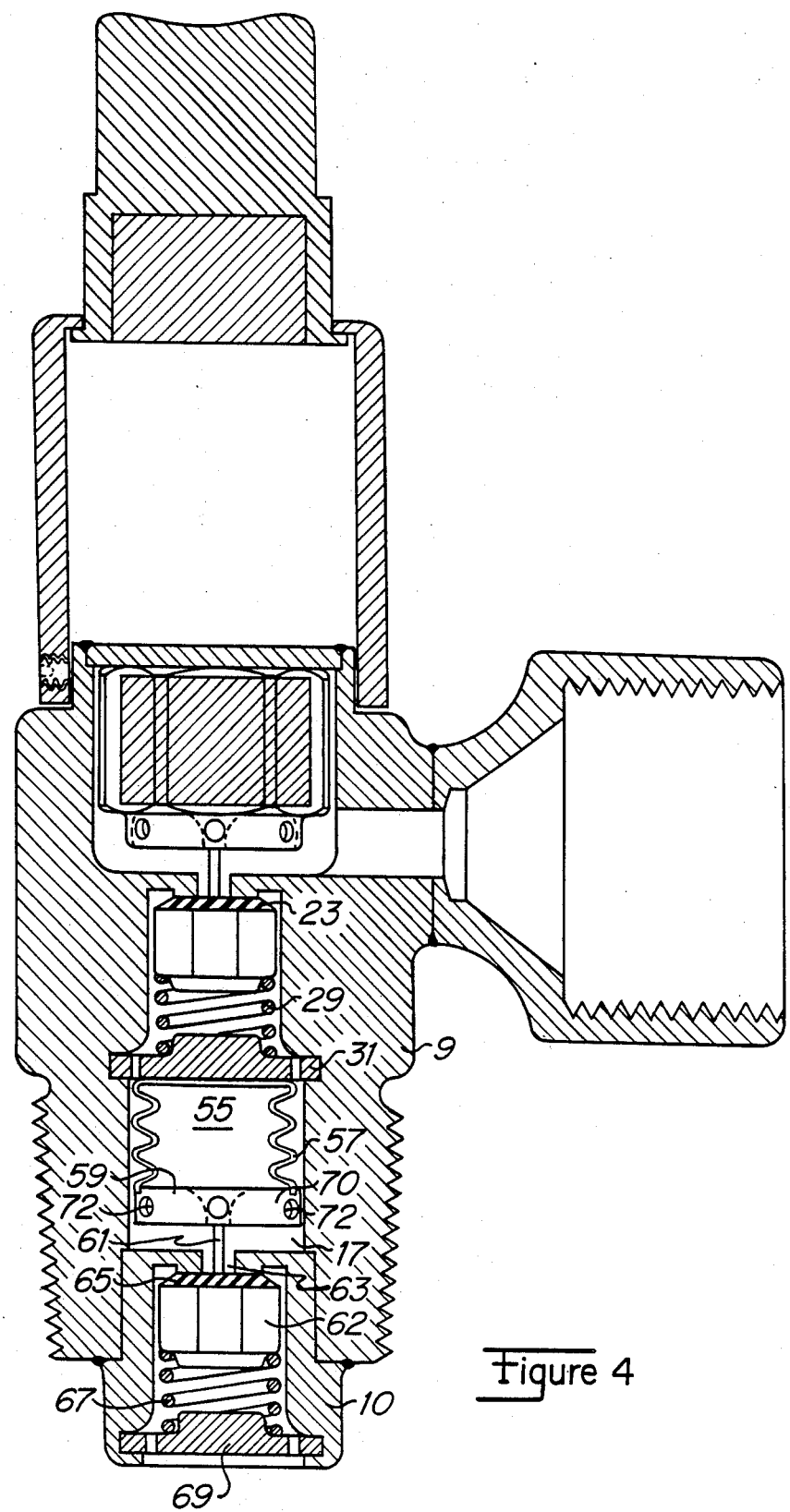
FIG. 4 is a pictorial sectional view of the valve of FIG. 1 including an improved pressure regulator within the body of the valve.

Referring now to FIG. 4, there is illustrated an embodiment of the present invention that is similar to the embodiment of FIG. 1 with the additional features of a pressure regulator included within the body 9, 10. Similar structural elements in FIGS. 1–4 bear the same legend numbers for purposes of clarity, and the additional elements assembled within the inlet channel 17 of housing 9 below the retainer 31 are disposed to operate as a pressure regulator. A sealed bellows 55 with flexible side walls 57 is mounted on the underside of spring retainer 31 to position its end wall 59 at a location that is a function of the differential between the internal and external pressures acting upon the bellows 55. The end wall 59 acts upon a central rod 61 which is attached to an auxiliary piston 62 and which protrudes through a second aperture 63 formed within the subhousing 10 that encloses the auxiliary piston 62. The auxiliary piston 62 carries an elastomeric seal 65 which is similar to the seal 23 and which forms a fluid-tight seal around aperture 63 that is enhanced by fluid pressure and by spring 67 that is mounted between the auxiliary piston 62 and spring retainer 69 to urge the sealing engagement of seal 65 around aperture 63. This fluid-tight seal may be altered and controlled by the position of end plate 59 of bellows 55 acting through rod 61. The bellows 55 may be pressurized to a selected gas pressure representative of the value of gas pressure about which pressure regulation is to occur. Thus, fluid pressure in channel 17 in excess of the bellows pressure causes the end plate 59 to be positioned away from the aperture 63 as the bellows 55 compresses. This causes the auxiliary piston 62 with seal 65 to move into sealing engagement with the aperture 63, thereby reducing fluid pressure downstream of the aperture and allowing the bellows 55 to expand.

Conversely, fluid pressure in the channel 17 lower than the bellows pressure causes the bellows 55 to expand and position the end plate 59 closer to aperture 63. This causes the auxiliary piston 62 with seal 65 to move away from sealing engagement around the aperture 63, thereby allowing fluid flow therethrough and the build up of pressure in inlet 17. The fluid pressure downstream of aperture 63 is thus self-regulated about the internal bellows pressure in response to movement of end plate 59 as the bellows 55 expands and compresses in response to fluid pressure in channel 17 acting upon the effective control surface area of the bellows 55. The end plate 59 includes a descending skirt or shield 70 with lateral apertures 72 therethrough to reduce the Bernoulli effect of fluid flowing through aperture 63, as previously described in connection with skirt 50, and this reduces possible sources of oscillatory motion of the auxiliary piston 62.

Therefore, the apparatus of the present invention is a button-actuated, normally-closed shut-off valve for a gas-supply cylinder that also provides excess-flow cut-off and pressure regulation in a low-profile valve body that obviates the need for sliding or rotating seals. In addition, the flow control valve of the present invention, assures quick, manual shut-off operation simply by unlatching the control button to allow the immediate restoration of pressure-enhanced and spring-enhanced closure against further fluid flow out of the supply cylinder.

What is claimed is:

1. An apparatus for controlling fluid flow comprising:
 a housing having a chamber operatively communicating with an inlet and outlet;
 a first valve seat in said chamber interposed between said inlet and outlet;

a first element received in said housing movable between open and closed position with said first valve seat;
means for biasing said first element to one of said open and closed positions;
control means freely received in said housing for movement toward and away from selective engagement with a surface adjacent said first valve seat, said control means having a magnet facilitating generally axial movement of said control means in said housing;
a first actuator disposed between said first element and control means, said first actuator imparting movement to said first element through a first range of movement of said first element when said first actuator abuttingly engages both said first element and said control means, and said first element being unaffected by said first actuator through a second range of movement of said first element;
a shield means extending outwardly from a first face of said control means toward said first valve seat for impeding development of Bernoulli forces between said control means and said surface adjacent said first valve seat, said shield means including plural, spaced apart openings extending generally laterally through said shield to permit fluid flow therethrough when said control means operatively engages said surface adjacent said first valve seat and reducing oscillatory motion of said control means; and,
an actuating magnet externally mounted to said housing and magnetically interactive with said control means magnet, said actuating magnet being selectively positionable relative thereto whereby said control means is selectively axially shifted.

2. An apparatus for controlling fluid flow comprising:
a housing having a chamber operatively communicating with an inlet and outlet;
a first valve seat in said chamber interposed between said inlet and outlet;
a first element received in said housing movable between open and closed positions with said first valve seat;
means for biasing said first element to one of said open and closed positions;
control means received in said housing for movement toward and away from a surface adjacent said first valve seat, said control means having a magnet facilitating generally axial movement of said control means in said housing;
a first actuator extending from one of said first element and control means, said first actuator imparting movement of said control means to said first element;
a shield means extending outwardly from a first face of said control means towards said first valve seat for impeding development of Bernoulli forces between said control means and said surface adjacent said first valve seat, said shield means including plural, spaced apart openings extending generally laterally through said shield means to permit fluid flow therethrough when said control means operatively engages said surface adjacent said first valve seat;
an actuating magnet externally mounted to said housing and magnetically interactive with said control means magnet, said actuating magnet being selectively positionable to first, second, and third distinct axial positions relative to said control means, said first position remotely spacing said actuating magnet from said control means whereby said control means and first element are substantially uneffected by said actuating magnet, said second position minimizing the spacing between said actuating magnet and control means whereby said first element is urged away from its first position, and said third position spacing said actuating magnet intermediately of said first and second positions whereby said control means and first element are effected by said actuating magnet, fluid flow, and said biasing means; and
means for latching said actuating magnet in said third position.

3. An apparatus for controlling fluid flow comprising:
a housing having a chamber operatively communicating with an inlet and outlet;
a first valve seat in said chamber interposed between said inlet and outlet;
a first element received in said housing movable between open and closed positions with said first valve seat, said first element further including peripheral grooves for establishing a force thereon proportional to the flow rate of fluid passing through the apparatus;
means for biasing said first element to one of said open and closed positions;
control means freely received in said housing for movement toward and away from selective engagement with a surface adjacent said first valve seat, said control means having a magnet facilitating generally axial movement of said control means in said housing;
a first actuator abuttingly engaging one of said first element and control means, said first actuator imparting movement of said control means to said first element;
a shield means extending outwardly from a first face of said control means toward said first valve seat for impeding development of Bernoulli forces between said control means and said surface adjacent said first valve seat, said shield means including plural, spaced apart openings extending generally laterally through said shield to permit fluid flow therethrough when said control means operatively engages said surface adjacent said first valve seat and reducing oscillatory motion of said control means; and,
an actuating magnet externally mounted to said housing and magnetically interactive with said control means magnet, said actuating magnet being selectively positionable relative thereto whereby said control means is selectively axially shifted.

4. An apparatus for controlling fluid flow comprising:
a housing having a chamber operatively communicating with an inlet and outlet;
a first valve seat in said chamber interposed between said inlet and outlet;
a first element received in said housing movable between open and closed positions with said first valve seat;
means for biasing said first element to one of said open and closed positions;
control means freely received in said housing for movement toward and away from selective engagement with a surface adjacent said first valve seat, said control means having a magnet facilitating generally axial movement of said control means in said housing;

a first actuator abuttingly engaging one of said first element and control means, said first actuator imparting movement of said control means to said first element;

a shield means extending outwardly from a first face of said control means toward said first valve seat for impeding developing of Bernoulli forces between said control means and said surface adjacent said first valve seat, said shield means including plural, spaced apart openings extending generally laterally through said shield to permit fluid flow therethrough when said control means operatively engages said surface adjacent said first valve seat and reducing oscillatory motion of said control means;

an actuating magnet externally mounted to said housing and magnetically interactive with said control means magnet, said actuating magnet being selectively positionable relative thereto whereby said control means is selectively axially shifted;

pressure regulating means disposed in said housing, said pressure regulating means including a second valve seat disposed on one side of said first valve seat;

a second element received in said housing movable between open and closed positions with said second valve seat;

means for biasing said second element to one of said open and closed positions;

bellows means having a first end fixed relative to said housing and a second end adapted for movement relative to said second valve seat in response to fluid pressure; and, a second actuator extending from one of said second element and said bellows for imparting movement of said bellows second end to said second element.

5. The apparatus as defined in claim 4 further comprising a second shield means disposed on said bellows second end for impeding development of Bernoulli forces between said bellows means and an area adjacent aid second valve seat.

6. The apparatus as defined in claim 4 wherein said second valve seat is interposed between said inlet and said first valve seat.

* * * * *